United States Patent
Ramanandan et al.

(10) Patent No.: US 9,123,135 B2
(45) Date of Patent: Sep. 1, 2015

(54) ADAPTIVE SWITCHING BETWEEN VISION AIDED INS AND VISION ONLY POSE

(75) Inventors: Arvind Ramanandan, San Diego, CA (US); Christopher Brunner, San Diego, CA (US); Mahesh Ramachandran, San Diego, CA (US); Abhishek Tyagi, San Diego, CA (US); Daniel Knoblauch, San Diego, CA (US); Murali Ramaswamy Chari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 13/523,634

(22) Filed: Jun. 14, 2012

(65) Prior Publication Data
US 2013/0335562 A1    Dec. 19, 2013

(51) Int. Cl.
*G06T 7/20*  (2006.01)
*H04N 5/232*  (2006.01)
*G01S 3/786*  (2006.01)

(52) U.S. Cl.
CPC .............. *G06T 7/2053* (2013.01); *G01S 3/786* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 6,064,749 A * | 5/2000 | Hirota et al. | 382/103 |
| 7,162,338 B2 | 1/2007 | Goncalves et al. | |
| 2007/0070069 A1 | 3/2007 | Samarasekera et al. | |
| 2009/0087029 A1 | 4/2009 | Coleman et al. | |
| 2009/0110267 A1 | 4/2009 | Zakhor et al. | |
| 2009/0248304 A1 | 10/2009 | Roumeliotis et al. | |
| 2010/0013917 A1 * | 1/2010 | Hanna et al. | 348/143 |
| 2010/0067741 A1 * | 3/2010 | Stolkin et al. | 382/103 |
| 2010/0119117 A1 * | 5/2010 | Gold, Jr. | 382/107 |
| 2011/0135149 A1 * | 6/2011 | Gefen | 382/103 |
| 2011/0142282 A1 * | 6/2011 | Srikrishnan et al. | 382/103 |
| 2011/0142283 A1 * | 6/2011 | Huang et al. | 382/103 |
| 2011/0206236 A1 | 8/2011 | Center, Jr. | |
| 2012/0082340 A1 * | 4/2012 | Fields et al. | 382/103 |

FOREIGN PATENT DOCUMENTS

| | | |
|---|---|---|
| EP | 2441504 A2 | 4/2012 |
| GB | 2481098 A | 12/2011 |

OTHER PUBLICATIONS

International Search Report and Written Opinion—PCT/US2013/045012—ISA/EPO—Sep. 12, 2013.
Taiwan Search Report—TW102120959—TIPO—Nov. 4, 2014.

* cited by examiner

*Primary Examiner* — Jay Patel
*Assistant Examiner* — Reza Aghevli
(74) *Attorney, Agent, or Firm* — Silicon Valley Patent Group LLP (57) ABSTRACT

A mobile device tracks a relative pose between a camera and a target using Vision aided Inertial Navigation System (VINS), that includes a contribution from inertial sensor measurements and a contribution from vision based measurements. When the mobile device detects movement of the target, the contribution from the inertial sensor measurements to track the relative pose between the camera and the target is reduced or eliminated. Movement of the target may be detected by comparing vision only measurements from captured images and inertia based measurements to determine if a discrepancy exists indicating that the target has moved. Additionally or alternatively, movement of the target may be detected using projections of feature vectors extracted from captured images.

28 Claims, 4 Drawing Sheets

ADAPTIVE SWITCHING BETWEEN VISION AIDED INS AND VISION ONLY POSE

BACKGROUND

1. Background Field

Embodiments of the subject matter described herein are related pose determination, and more particularly, the use of vision based techniques for pose determination.

2. Relevant Background

In Augmented Reality (AR) type applications, the pose (translation and attitude) of the camera with respect to the imaged environment is determined and tracked. In a vision-only pose approach, the pose of the camera with respect to a feature rich target in the environment is determined and tracked using captured images, e.g., frames of video. The vision-only pose is estimated, e.g., at every frame and statistical models are used to predict the pose at the next frame, providing an initialization point for the pose refinement algorithm.

Modern devices, such as cellular telephones, are typically equipped with inertial sensors that are capable of measuring the rate of change in the pose of the device relative to the inertial frame, which is known as an Inertial Navigation System (INS). The information provided by INS can be used to improve vision only pose estimates of the camera relative to the target because the absolute pose, i.e., the pose of the device with respect to the inertial frame, and the relative poses, i.e., the pose of the camera with respect to a target, differ by a constant transformation. The combination of vision only pose and INS is typically referred to as Vision aided INS (VINS).

The VINS approach uses more information than either vision only pose or INS separately, and thus, in generally VINS performs better than either method alone. Nevertheless, under certain circumstances the VINS approach performs poorly compared to the vision-only approach. Moreover, the performance of the VINS approach may degrade based on conditions external to the mobile device, and thus, the degradation may be unpredictable.

SUMMARY

A mobile device tracks a relative pose between a camera and a target using Vision aided Inertial Navigation System (VINS), that includes a contribution from inertial sensor measurements and a contribution from vision based measurements. When the mobile device detects movement of the target, the contribution from the inertial sensor measurements to track the relative pose between the camera and the target is reduced or eliminated. Movement of the target may be detected by comparing vision only measurements from captured images and inertia based measurements to determine if a discrepancy exists indicating that the target has moved. Additionally or alternatively, movement of the target may be detected using projections of feature vectors extracted from captured images.

In one implementation, a method includes tracking a relative pose between a camera and a target using a contribution from inertial sensor measurements and a contribution from vision based measurements; detecting movement of the target; and reducing the contribution from the inertial sensor measurements to track the relative pose between the camera and the target when movement of the target is detected.

In one implementation, a mobile device includes a camera capable of capturing images of a target; inertial sensors; and a processor coupled to receive captured images of the target and coupled to receive signals from the inertial sensors, the processor configured produce vision based measurements using the captured images of the target and inertial sensor measurements using the signals from the inertial sensors, the processor being configured to track a relative pose between the camera and the target using a contribution from the inertial sensor measurements and a contribution from the vision based measurements, the processor being further configured to detect movement of the target and to reduce the contribution from the inertial sensor measurements to track the relative pose between the camera and the target when movement of the target is detected.

In one implementation, a mobile device includes means for tracking a relative pose between a camera and a target using a contribution from inertial sensor measurements and a contribution from vision based measurements; means for detecting movement of the target; and means for reducing the contribution from the inertial sensor measurements to track the relative pose between the camera and the target when movement of the target is detected.

In one implementation, a non-transitory computer-readable medium including program code stored thereon, includes program code to track a relative pose between a camera and a target using a contribution from inertial sensor measurements and a contribution from vision based measurements; program code to detect movement of the target; and program code to reduce the contribution from the inertial sensor measurements to track the relative pose between the camera and the target when movement of the target is detected.

DETAILED DESCRIPTION

Figure 1:
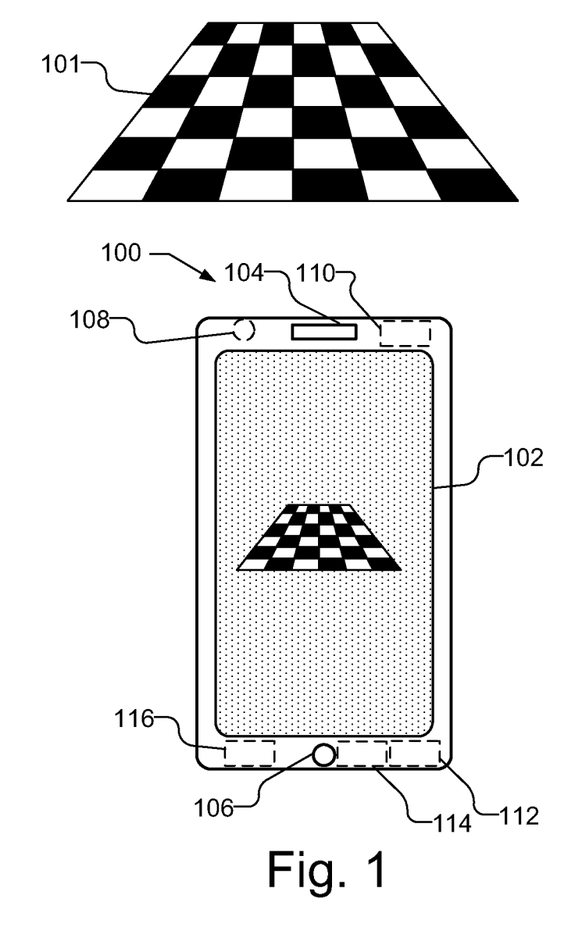
FIG. 1 illustrates a mobile device capable of detecting and tracking a target by adaptively switching between a VINS tracking approach and a vision only tracking approach.

FIG. 1 illustrates a mobile device 100 capable of detecting and tracking a target 101 by adaptively switching between a VINS approach when the target 101 is stationary and a vision-only approach when the target is moving. In some implementations, the mobile device 100 may substantially reduce the contributions of the inertial sensor measurements when movement of the target 101 is detected instead of completely eliminating the contributions of the inertial sensor measurements.

As used herein, a mobile device refers to any portable electronic device such as a cellular or other wireless communication device, personal communication system (PCS) device, personal navigation device (PND), Personal Information Manager (PIM), Personal Digital Assistant (PDA), or other suitable mobile device including wireless communication devices, computers, laptops, tablet computers, etc. that are capable of capturing images of the environment, which may be used in vision-based tracking or VINS. The mobile device may be capable of receiving wireless communication and/or navigation signals, such as navigation positioning signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

The mobile device 100 includes a display 102, which may be a touch screen display. The mobile device 100 includes a forward facing camera 108 to image the environment such as target 101, which is illustrated as being shown on display 102. The images or frames produced by the camera 108 are used by vision pose module 112 to generate a computer vision based pose. It should be understood that the camera 108 may capture images and/or frames of video, and that the terms image and frame are used interchangeably herein. The mobile device 100 also includes inertial sensors 110, such as accelerometers, gyroscopes or the like, which may be used to assist in determining the pose of the mobile device 100. The output of the inertial sensors 110 is used by an inertial sensory system (INS) module 114 to determine a change in pose of the mobile device and may produce an INS pose. The mobile device 100 further includes a VINS module 116 that combines the pose from the vision based pose module 112 and the pose from the INS module 114. While the INS module 114 and VINS module 116 are illustrated separately, it should be understood that the INS module 114 may be part of the VINS module 116. In operation, the mobile device 100 uses the VINS module 116 to determine the pose with respect to the target 101 when the target 101 is stationary, i.e., relative to the inertial reference frame, and switches to the vision based pose module 112 to determine the pose relative to the target 101 when the target 101 is moving.

The mobile device 100 may also include other features that are not relevant to the present disclosure, such as a speaker 104 and microphone 106, e.g., if the mobile device 100 is a cellular telephone.

Figure 2:
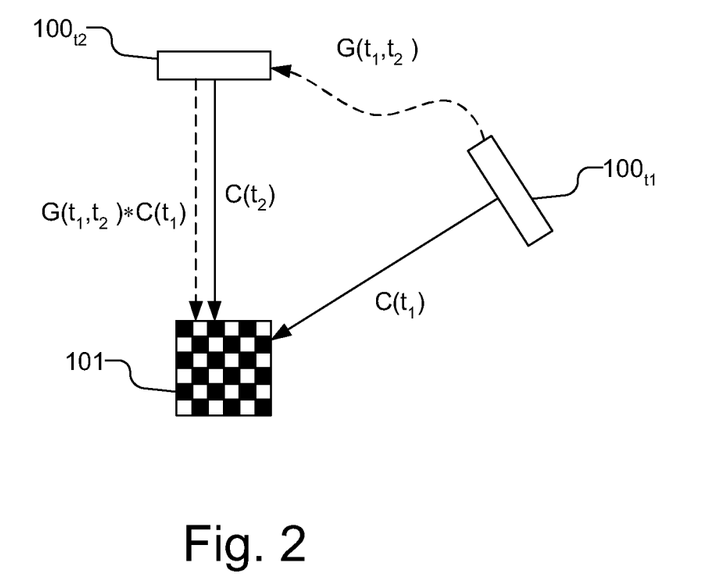
FIG. 2 illustrates a top view of a stationary target and a moving mobile device at different times and poses generated using a vision only approach and a VINS approach.

FIG. 2 illustrates a top view of a stationary target 101 and a moving mobile device 100 at first time $t_1$ and a second time $t_2$, as identified by the reference numbers 100$_{t1}$ and 100$_{t2}$. At the first time $t_1$, the vision based pose module 112 of the mobile device 100 produces a first pose $C(t_1)$ with respect to the target 101. At the second time $t_2$, the vision based pose module 112 of the mobile device 100 generates a second pose $C(t_2)$ with respect to the target 101. Between the first time $t_1$ and the second time $t_2$, the mobile device 100 moves as illustrated by path $G(t_1,t_2)$. The INS module 114 uses signals sampled from the inertial sensors 110 to measure the change in position $G(t_1,t_2)$ of the mobile device. As illustrated by the broken line in FIG. 2, when the change in position $G(t_1,t_2)$ and the first pose $C(t_1)$ are combined, i.e., $G(t_1,t_2)*C(t_1)$, which may be performed by the INS module 114 or the VINS module 116, the result is ideally the same as the second pose $C(t_2)$.

The VINS module 116 combines the results from the pose $C(t_2)$ from the vision based pose module 112 and the pose $G(t_1,t_2)*C(t_1)$ resulting from the INS module 114, e.g., using an Extended Kalman filter, to produce a final pose. It should be understood that the use of an Extended Kalman filter is merely one possible pose estimators and that other pose estimators may be used if desired.

Figure 3:
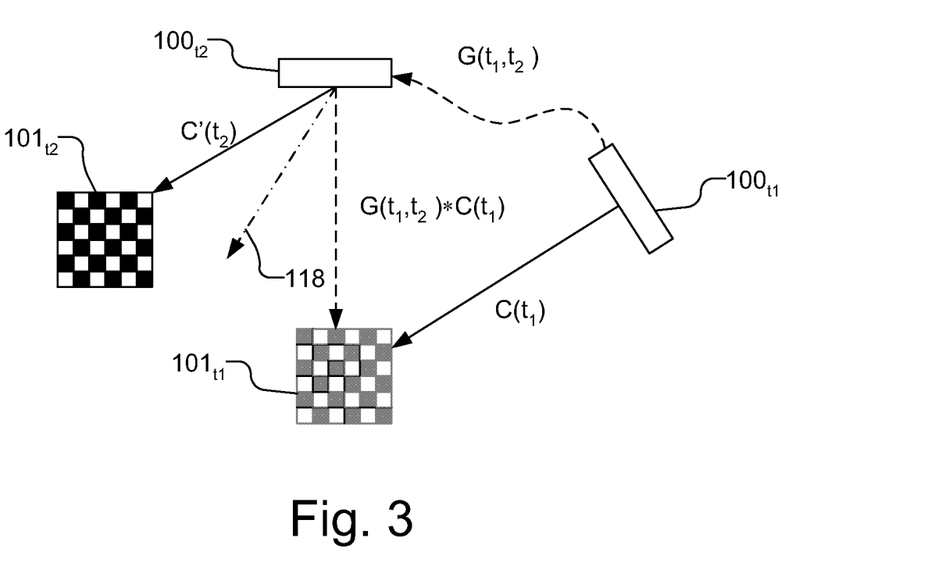
FIG. 3 is similar to FIG. 2, but illustrates a top view of a moving mobile device and a moving target at different times and poses generated using a vision only approach and a VINS approach.

FIG. 3 is similar to FIG. 2, but illustrates a top view of a moving mobile device 100 and a moving target 101 at first time $t_1$ and second time $t_2$, as identified by the reference numbers. The vision based pose module 112 estimates the relative pose between the target 101 and the camera 108, whereas, the INS module 114 samples signals from inertial sensors 110 to measure the rate of change of the pose between the inertial sensors 110 and the inertial frame. If the target 101 is stationary relative to the inertial frame, the inertial sensor measurements can, in principle, track the rate of change of the pose of the camera 108 relative to target 101, as illustrated in FIG. 2. However, if the target 101 moves, then the motion of the target 101 affects the vision based pose module 112, but not the INS module 114. Thus, as illustrated in FIG. 3, because the target 101 has moved between time $t_1$ and time $t_2$, the vision based pose module 112 will produce a pose $C'(t_2)$, which is different than the pose $C(t_2)$ generated for a stationary target 101 as shown in FIG. 2. The INS module 114, however, uses only signals sampled from the inertial sensors 110, and thus, produces the change in pose $G(t_1,t_2)$ of the mobile device, which is independent of the change in position of the target 101. As illustrated by the broken line in FIG. 3, the resulting pose $G(t_1,t_2)*C(t_1)$ from the INS module 114 is relative to the position of the target 101 at time $t_1$ and, thus, will be different than the vision based pose $C'(t_2)$, which is relative to the target 101 at time $t_2$ after having moved. The VINS module 116 combines the results from the pose $C'(t_2)$ from the vision based pose module 112 and the pose $G(t_1,t_2)*C(t_1)$ resulting from the INS module 114, to produce a combined pose 118 that is inaccurate. Thus, it can be seen that when target 101 is moving, the pose produced by the vision based pose module 112 by itself is more accurate than the pose produced by the VINS module 116. Accordingly, when the target 101 is moving with respect to the inertial system, the pose from the vision based pose module 112 should be used as the most accurate pose.

Figure 4:
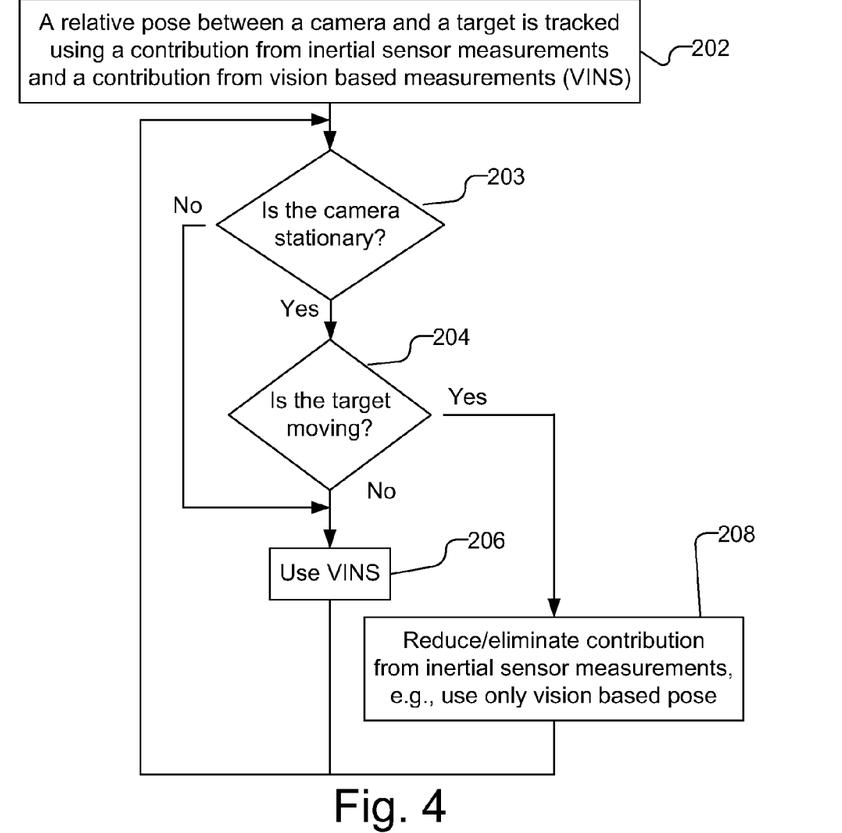
FIG. 4 is a flow chart illustrating a method of detecting and tracking a target by adaptively switching between a VINS approach when the target is stationary and a vision-only approach when the target is moving.

FIG. 4 is a flow chart illustrating a method of detecting and tracking a target by adaptively switching between a VINS approach when the target is stationary and a vision-only approach when the target is moving. As illustrated, a relative pose between a camera and a target is tracked using a contribution from inertial sensor measurements and a contribution from vision based measurements (202). In other words, VINS is performed to track the pose between the camera and the target. The VINS approached is generally described above in reference to FIGS. 2 and 3 and is well known to those of ordinary skill in the art. In general, the VINS approach may estimate a pose by combining the pose determined using vision based techniques and a pose generated using inertial sensors. If desired, the poses from the different techniques may be weighted to generate the estimated VINS pose. By way of example, using the parameters from FIGS. 2 and 3, the VINS pose may be determined as follows, where $w_1$ and $w_2$ are adjustable weighting factors.

$$\text{VINS\_Pose} = \frac{w_1(G(t_1, t_1) * C(t_1)) + w_2(C(t_2))}{w_1 + w_2}. \qquad \text{eq. 1}$$

If the target is not moving (204), the VINS approach continues to be used (206). On the other hand, if the target is determined to be moving (204), the contribution from inertial sensor measurements to track the relative pose between the camera and the target is reduced (208). By way of example, the contribution from the inertial sensor measurements may be eliminated so that only vision based tracking is used when movement of the target is detected. The use of vision based tracking is generally described above in reference to FIGS. 2 and 3 and is well known to those of ordinary skill in the art. It should be understood that the present disclosure contemplates substantially reducing, but not necessarily completely eliminating the contribution from the inertial sensor measurements, e.g., by adjusting the weighting factors in equation 1 to eliminate a meaningful effect of the influence of the pose generated using inertial sensors. If desired, the weighting may be varied based on a confidence in the target motion detection. The variation in confidence may be the result of, e.g., quality of the image frames, noise, etc. For example, if motion detection indicates that the target 101 is moving, but with very low confidence, the weight for the inertia based pose, e.g., $w_1$ in equation 1, may be greater than 0, e.g., $w_1$=0.3. If on the other hand, if confidence in the detection is high, then the weight for the inertia based pose may be closer to or equal to zero. When motion of the target is detected to have stopped, the mobile device may switch back to the VINS approach, in which the contribution from inertial sensor measurements is used to track the relative pose between the camera and the target.

Additionally, as illustrated, the detection of movement of the target (204) may be performed only when the camera is determined to be stationary (203), i.e., ignoring small movements caused by hand jitter or the like. The camera may be determined to be stationary or moving based on measurements from the inertial sensors 110. For example, the standard deviation of the norm of measurements from the inertial sensors 110, which may be, e.g., gyroscopes, may be computed over a predetermined time period and if the standard deviation is above a certain threshold, then it may be concluded that the mobile device is in motion. If the mobile device 100 is determined to be moving, then the VINS continues to be used (206). If the mobile device 100 is determined to be stationary, then the mobile device 100 may proceed to evaluate if the target is moving (204) as discussed above. Determining that the mobile device 100 is stationary is useful as vision based pose estimates are more accurate in general when the mobile device is stationary, since motion artifacts like motion blur and rolling shutter are mitigated. Thus, the robustness is increased and there is a smaller probability of false detection of target motion.

There are several ways to detect motion of the target (204). As discussed above, when the target 101 is stationary, the pose estimate produced using inertial sensor measurements will be approximately the same as the pose estimate produced using vision based techniques. On the other hand, when the target 101 moves, the motion of the target will affect the pose estimate produced using vision based techniques, but not the pose estimate produced using inertial sensor measurements. Thus, the discrepancy in the pose estimates or in determined changes in the poses may be used to determine if the target 101 is stationary or moving.

Figure 5:
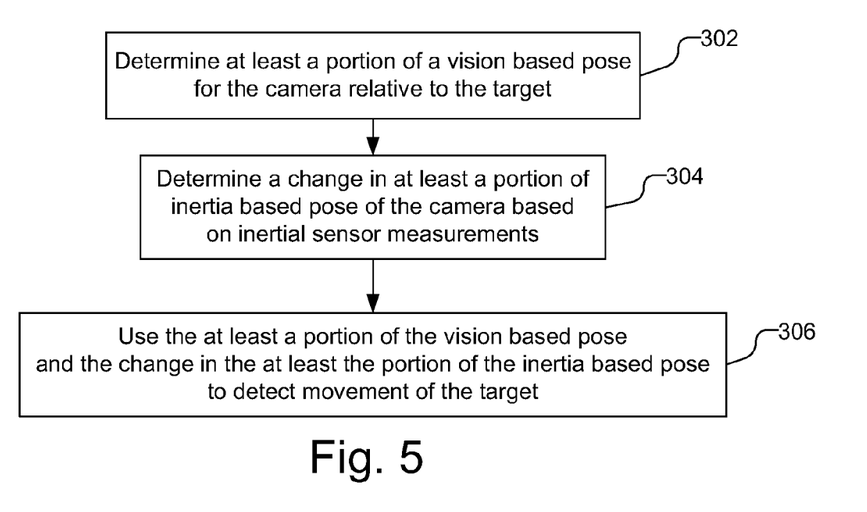
FIG. 5 is a flow chart illustrating a method of determining whether a target is moving using at least a portion of the poses determined by the vision based measurements and inertial sensor measurements.

FIG. 5 is a flow chart illustrating a method of determining whether a target is moving using at least a portion of the poses determined by the vision based measurements and inertial sensor measurements. As illustrated, at least a portion of a vision based pose for the camera relative to the target is determined (302). By way of example, if desired, only the vision based attitude, e.g., from vision based pose module 112, may be determined, thereby detecting rotation of the target relative to the camera. Alternatively, the translation vector, rather than the attitude, may be used. A change in at least a portion of the inertia based pose of the camera is determined based on inertial sensor measurements (304). Again, if desired, only the inertia based attitude, e.g., from INS module 114, may be determined. Alternatively, the translation vector, rather than the attitude, may be used. The change in at least a portion of the inertia based pose may be determined, e.g., by integrating the samples signals from the inertial sensors 110 over a predetermined time window. The amount of time, i.e., the integrating interval, should be small enough so as to limit effects of integration of sensor biases and components of gravity resulting from attitude errors but long enough so that target motion effects are detectably different from background sensor noise. It should be understood that the use of the translation vector and attitude to detect movement is mathematically equivalently to using translational acceleration, translation velocity, angular acceleration, and angular velocity.

The at least a portion of the vision based pose and the change in the at least a portion of the inertia based pose are used to detect movement of the target (306). In one example, the vision based pose may be compared to an inertia based pose, determined using the change in the inertia based pose, which is compared to a threshold to determine if the target has moved. In another example, a change in the inertia based pose may be compared to a change in the vision based pose, determined using multiple vision based poses, which is compared to a threshold to determine if the target has moved. The differences between the poses or changes in poses may be determined as the norm of the difference in pose or change in pose scaled for inertia sensor measurement noise. The thresholds used should be small enough to detect small movement, but large enough to exclude unintentional movement, such as hand jitter.

In the example where the vision based pose is compared to an inertia based pose, at least a portion of an inertia based pose is determined using the change in the at least the portion of the inertia based pose. By way of illustration, the change in an inertia based attitude may be combined with an earlier vision based attitude to determine a current inertia based attitude. A difference between the at least the portion of the vision based pose and the at least the portion of the inertia based pose may be determined and compared to a threshold to determine the target has moved.

In the example where the change in the inertia based pose is compared to a change in the vision based pose, a change in the at least a portion of the vision based pose may be determined based on the at least a portion of the vision based pose and the at least a portion of an earlier vision based pose. By way of illustration, a first vision based attitude may be compared with a second vision based attitude to determine the change in vision based attitude. A difference between the change in the at least a portion of the inertia based pose and the change in the at least a portion of the vision based pose may be determined and compared to a threshold to determine if the target has moved.

Figure 6:
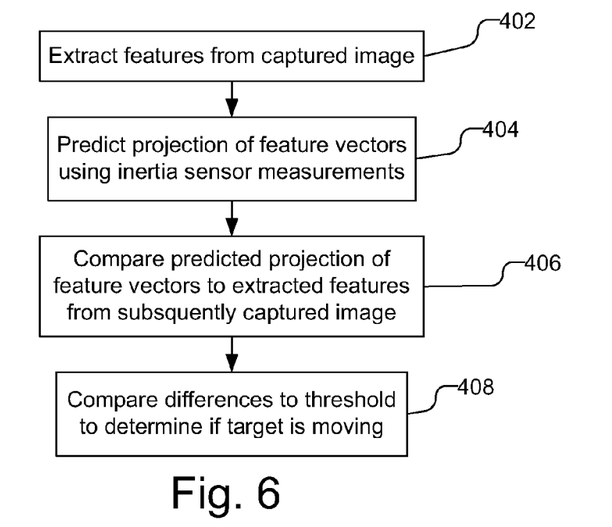
FIG. 6 is a flow chart illustrating another method of determining whether a target is moving using projected feature vectors.

Additionally or alternatively, movement of the target 101 may be detected by projecting feature vectors in the captured images when a tightly coupled VINS approach is used. FIG. 6 is a flow chart illustrating the use of projected feature vectors to detect movement of the target. As illustrated, features are extracted from captured images (402). Features may be extracted using Speeded UP Robust Features (SURF), Scale-invariant Feature Transform (SIFT), or any other desired feature extraction technique. The projection of the feature vectors is predicted based on the measurements from the inertial sensors (404). The predicted projections of the feature vectors are compared to the extracted features in a subsequently captured image (406). The difference, which may be an average difference or other statistical metric, is compared to a threshold to determine if the target is moving (408).

Figure 7:
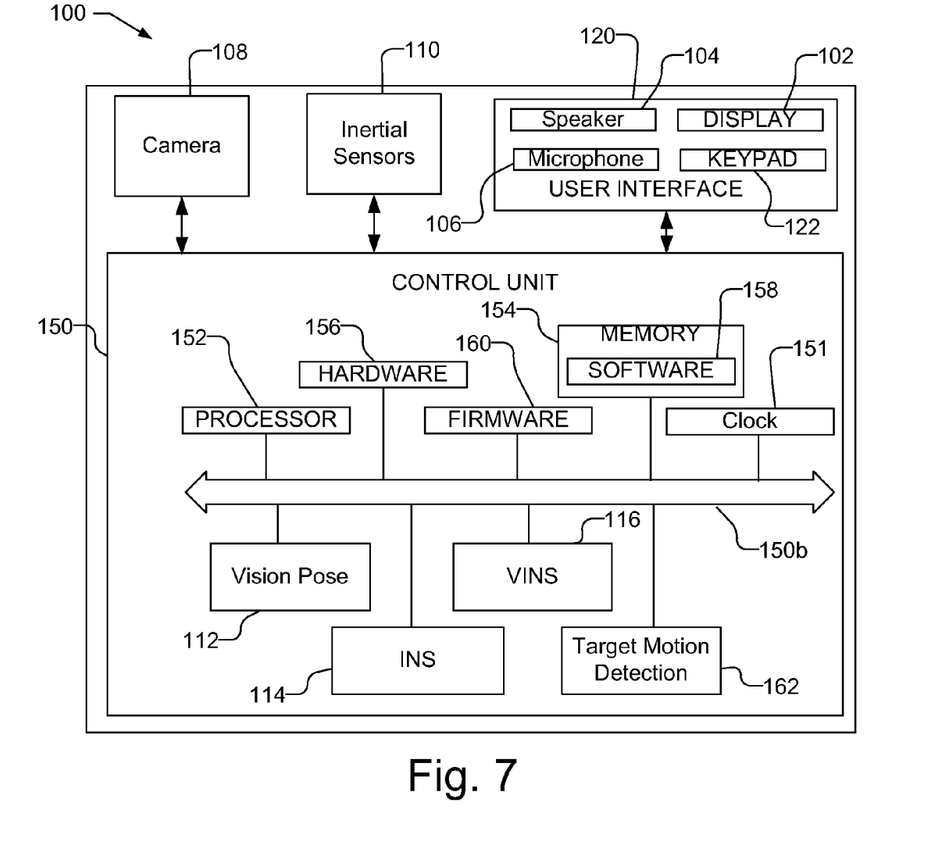
FIG. 7 is a block diagram of the mobile device capable of detecting and tracking a target by adaptively switching between a VINS approach and a vision-only approach.

FIG. 7 is a block diagram of the mobile device 100 capable of detecting and tracking a target 101 by adaptively switching between a VINS approach and a vision-only approach when the target is moving using the described process. The mobile device 100 includes the camera 108, that captures images of the target 101, e.g., as frames of video, and inertial sensors 110. The inertial sensors 110 may be, e.g., accelerometers, gyroscopes or the like. The mobile device 100 may include a user interface 120 that includes the display 102 and a keypad 122 or other input device through which the user can input information into the mobile device 100. The user interface 120 may also include the speaker 104 and microphone 106, e.g., when the mobile device is a cellular telephone or the like. Of course, the mobile device 100 may include other elements unrelated to the present disclosure.

The mobile device 100 also includes a control unit 150 that is connected to and communicates with the camera 108 and inertial sensors 110. The control unit 150 may be provided by a bus 150b, a processor 152 and associated memory 154, and may include hardware 156, software 158, and firmware 160. The control unit 150 may include a vision based pose module 112, which determines the pose of the camera 108, and thus, mobile device 100, with respect to a target using images captured by the inertial sensors 110. The control unit 150 may further include an INS module 114, which determines the change in pose of the mobile device based on signals sampled from the inertial sensors 110. The INS module 114 may determine the pose of the mobile device with respect to the target using the determined change in pose from the inertial sensors and a previously determine pose of the mobile device from the vision based pose module 112. The control unit 150 further the VINS module 116 that combines the pose from the vision based pose module 112 and the pose (or change in pose) from the INS module 114. The control unit 150 additionally includes a target motion detection module 162, which detects whether the target is moving as discussed above.

The various processing units, e.g., vision based pose module 112, INS module 114, VINS module 116, and target motion detection module 162, are illustrated separately from each other and from the processor 152 for clarity, but may be combined together, e.g., the INS module 114 may be part of the VINS module 116 and/or part of the processor 152 or implemented in the processor based on instructions in the software 158 which is run in the processor 152. It will be understood as used herein that the processor 152, and/or the various processing units, can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 156, firmware 160, software 158, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 154 and executed by the processor 152. Memory may be implemented within or external to the processor 152. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In one implementation, the mobile device includes a means for tracking a relative pose between a camera and a target using a contribution from inertial sensor measurements and a contribution from vision based measurements, which may be, e.g., the VINS module 116 or processor 152. The mobile device may further include a means for detecting movement of the target, which may be the target motion detection module 162 or processor 152. The mobile device may further include a means for reducing the contribution from the inertial sensor measurements to track the relative pose between the camera and the target when movement of the target is detected, which may be the VINS module 116, the vision based pose module 112, or the processor 152. Additionally, the means for detecting movement of the target may include the means for determining at least a portion of a vision based pose of the camera relative to the target, which may be, e.g., the vision based pose module 112 or processor 152; means for determining a change in at least a portion of an inertia based pose of the camera based on inertia sensor measurements, which may be the INS module 114 or processor 152, and a means for using the at least the portion of the vision based pose and the change in the at least the portion of the inertia based pose to the detect movement of the target, which may be, e.g., target motion detection module 162 or processor 152. The mobile device may additionally include means for determining that the camera is stationary before detecting the movement of the target, which may be, e.g., the inertia sensors 110, the INS module 114, or the processor 152. Additionally, the means for detecting movement of the target may include the means for using projections of feature vectors based on the inertial sensor measurements, which may be, e.g., the vision based pose module 112, the INS module 114, the target motion detection module 162 or processor 152.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
    tracking a relative pose between a camera and a target using a contribution from inertial sensor measurements and a contribution from vision based measurements,
        wherein the contribution from the inertial sensor measurements is a weighted contribution and the contribution from the vision based measurements is a weighted contribution;
    detecting movement of the target; and
    reducing the weighted contribution from the inertial sensor measurements to track the relative pose between the camera and the target when movement of the target is detected.

2. The method of claim 1, wherein reducing the weighted contribution from the inertial sensor measurements comprises eliminating the weighted contribution from the inertial sensor measurements, wherein the relative pose between the camera and the target is tracked using only vision based measurements when the movement of the target is detected.

3. The method of claim 1, wherein detecting movement of the target comprises:
    determining at least a portion of a vision based pose of the camera relative to the target;
    determining a change in at least a portion of an inertia based pose of the camera based on inertia sensor measurements; and
    using the at least the portion of the vision based pose and the change in the at least the portion of the inertia based pose to the detect movement of the target.

4. The method of claim 3, wherein:
    the at least the portion of the vision based pose comprises a vision based attitude;
    the change in the at least the portion of the inertia based pose comprises a change in an inertia based attitude; and
    using the at least the portion of the vision based pose and the change in the at least the portion of the inertia based pose comprises using the vision based attitude and the change in the inertia based attitude to detect the movement of the target.

5. The method of claim 3, further comprising:
    determining a change in the at least the portion of the vision based pose;
    wherein using the at least the portion of the vision based pose and the change in the at least the portion of the inertia based pose comprises:
    determining a difference between the change in the at least the portion of the inertia based pose and the change in the at least the portion of the vision based pose;
    comparing the difference to a threshold to determine the target has moved.

6. The method of claim 3, further comprising:
    determining at least a portion of an inertia based pose using the change in the at least the portion of the inertia based pose;
    wherein using the at least the portion of the vision based pose and the change in the at least the portion of the inertia based pose comprises:
    determining a difference between the at least the portion of the vision based pose and the at least the portion of the inertia based pose;
    comparing the difference to a threshold to determine the target has moved.

7. The method of claim 1, further comprising determining that the camera is stationary before detecting the movement of the target.

8. The method of claim 1, wherein detecting movement of the target comprises using projections of feature vectors based on the inertial sensor measurements.

9. The method of claim 8, further comprising:
    extracting features from captured images
    predicting the projections of feature vectors based on the inertial sensor measurements;
    comparing the projections of feature vectors to extracted feature vectors extracted from a captured image to determine a difference; and
    comparing the difference to a threshold to determine the target has moved.

10. A mobile device comprising:
    a camera capable of capturing images of a target;
    inertial sensors; and
    a processor coupled to receive captured images of the target and coupled to receive signals from the inertial sensors, the processor configured produce vision based measurements using the captured images of the target and inertial sensor measurements using the signals from the inertial sensors, the processor being configured to track a relative pose between the camera and the target using a contribution from the inertial sensor measurements and a contribution from the vision based measurements,
        wherein the contribution from the inertial sensor measurements is a weighted contribution and the contribution from the vision based measurements is a weighted contribution,
    the processor being further configured to detect movement of the target and to reduce the weighted contribution from the inertial sensor measurements to track the relative pose between the camera and the target when movement of the target is detected.

11. The mobile device of claim 10, wherein the processor is configured to reduce the weighted contribution from the inertial sensor measurements by being configured to eliminate the weighted contribution from the inertial sensor measurements, wherein the processor is configured to track the relative pose between the camera and the target with only the vision based measurements when the movement of the target is detected.

12. The mobile device of claim 10, wherein the processor is configured to detect movement of the target by being configured to:
    determine at least a portion of a vision based pose of the camera relative to the target;
    determine a change in at least a portion of an inertia based pose of the camera based on inertia sensor measurements; and
    use the at least the portion of the vision based pose and the change in the at least the portion of the inertia based pose to the detect movement of the target.

13. The mobile device of claim 12, wherein:
    the at least the portion of the vision based pose comprises a vision based attitude;
    the change in the at least the portion of the inertia based pose comprises a change in an inertia based attitude; and the processor is configured to use the at least the portion of the vision based pose and the change in the at least the portion of the inertia based pose by being configured to use the vision based attitude and the change in the inertia based attitude to detect the movement of the target.

14. The mobile device of claim 12, the processor being further configured to determine a change in the at least the portion of the vision based pose, wherein the processor is configured to use the at least the portion of the vision based pose and the change in the at least the portion of the inertia based pose by being configured to:
   determine a difference between the change in the at least the portion of the inertia based pose and the change in the at least the portion of the vision based pose;
   compare the difference to a threshold to determine the target has moved.

15. The mobile device of claim 12, the processor being further configured to determine at least a portion of an inertia based pose using the change in the at least the portion of the inertia based pose; wherein the processor is configured to use the at least the portion of the vision based pose and the change in the at least the portion of the inertia based pose by being configured to:
   determine a difference between the at least the portion of the vision based pose and the at least the portion of the inertia based pose;
   compare the difference to a threshold to determine the target has moved.

16. The mobile device of claim 10, the processor being further configured to determine that the camera is stationary before detecting the movement of the target.

17. The mobile device of claim 10, wherein the processor is configured to detect movement of the target by being configured to use projections of feature vectors based on the inertial sensor measurements.

18. The mobile device of claim 17, wherein the processor is further configured to:
   extract features from the captured images
   predict the projections of feature vectors based on the inertial sensor measurements;
   compare the projections of feature vectors to extracted feature vectors extracted from a captured image to determine a difference; and
   compare the difference to a threshold to determine the target has moved.

19. A mobile device comprising:
   means for tracking a relative pose between a camera and a target using a contribution from inertial sensor measurements and a contribution from vision based measurements,
      wherein the contribution from the inertial sensor measurements is a weighted contribution and the contribution from the vision based measurements is a weighted contribution;
   means for detecting movement of the target; and
   means for reducing the weighted contribution from the inertial sensor measurements to track the relative pose between the camera and the target when movement of the target is detected.

20. The mobile device of claim 19, wherein the means for reducing the weighted contribution from the inertial sensor measurements eliminates the weighted contribution from the inertial sensor measurements.

21. The mobile device of claim 19, wherein the means for detecting movement of the target comprises:
   means for determining at least a portion of a vision based pose of the camera relative to the target;
   means for determining a change in at least a portion of an inertia based pose of the camera based on inertia sensor measurements; and
   means for using the at least the portion of the vision based pose and the change in the at least the portion of the inertia based pose to the detect movement of the target.

22. The mobile device of claim 19, further comprising means for determining that the camera is stationary before detecting the movement of the target.

23. The mobile device of claim 19, wherein the means for detecting movement of the target comprises means for using projections of feature vectors based on the inertial sensor measurements.

24. A non-transitory computer-readable medium with instructions stored thereon that when executed on an electronic device causes the electronic device to perform:
   tracking a relative pose between a camera and a target using a contribution from inertial sensor measurements and a contribution from vision based measurements,
      wherein the contribution from the inertial sensor measurements is a weighted contribution and the contribution from the vision based measurements is a weighted contribution;
   detecting movement of the target; and
   reducing the weighted contribution from the inertial sensor measurements to track the relative pose between the camera and the target when movement of the target is detected.

25. The non-transitory computer-readable medium of claim 24 with instructions stored thereon that when executed on the electronic device causes the electronic device to reduce the weighted contribution from the inertial sensor measurements eliminates the weighted contribution from the inertial sensor measurements.

26. The non-transitory computer-readable medium of claim 24 with the instructions stored thereon that when executed on the electronic device that causes the electronic device to perform detecting movement of the target comprises instructions that when executed on the electronic device causes the electronic device to perform:
   determining at least a portion of a vision based pose of the camera relative to the target;
   determining a change in at least a portion of an inertia based pose of the camera based on inertia sensor measurements; and
   using the at least the portion of the vision based pose and the change in the at least the portion of the inertia based pose to the detect movement of the target.

27. The non-transitory computer-readable medium of claim 24, with instructions stored thereon that when executed on the electronic device causes the electronic device to further determine that the camera is stationary before detecting the movement of the target.

28. The non-transitory computer-readable medium of claim 24, with instructions stored thereon that when executed on the electronic device causes the electronic device to detect movement of the target wherein the detection comprises using projections of feature vectors based on the inertial sensor measurements.

* * * * *